United States Patent [19]

Fairbanks

[11] 3,847,701

[45] Nov. 12, 1974

[54] METHOD OF MAKING FORAMINOUS STRUCTURES

[75] Inventor: Theodore H. Fairbanks, Liverpool, Pa.

[73] Assignee: FMC Corporation, Philadelphia, Pa.

[22] Filed: Feb. 16, 1970

[21] Appl. No.: 11,510

[52] U.S. Cl. ............................................. 156/259
[51] Int. Cl. ......................................... B32b 31/00
[58] Field of Search .................. 156/259, 110-113, 156/253, 205, 292; 161/110-113, 68; 52/10; 229/29 F

[56] References Cited
UNITED STATES PATENTS 3,616,025  10/1971  Fairbanks ........................... 156/257

Primary Examiner—Samuel Feinberg

[57] ABSTRACT

A method of making a foraminous structure, having a plurality of walls, each extending between pairs of spaced surfaces which are disposed in staggered relationship along a common plane. The walls are pivotally connected to edges of the spaced surfaces between which they extend and may be disposed, relative thereto, at an angle approaching 180°.

7 Claims, 14 Drawing Figures

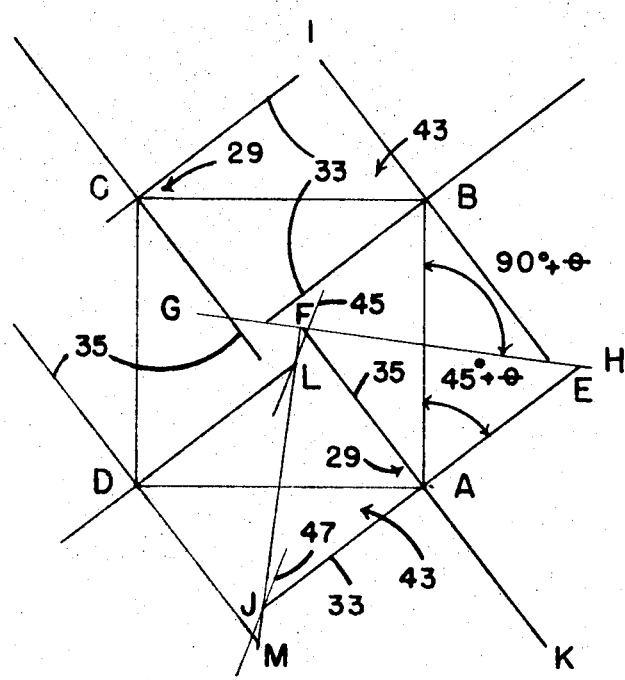
Fig. 2
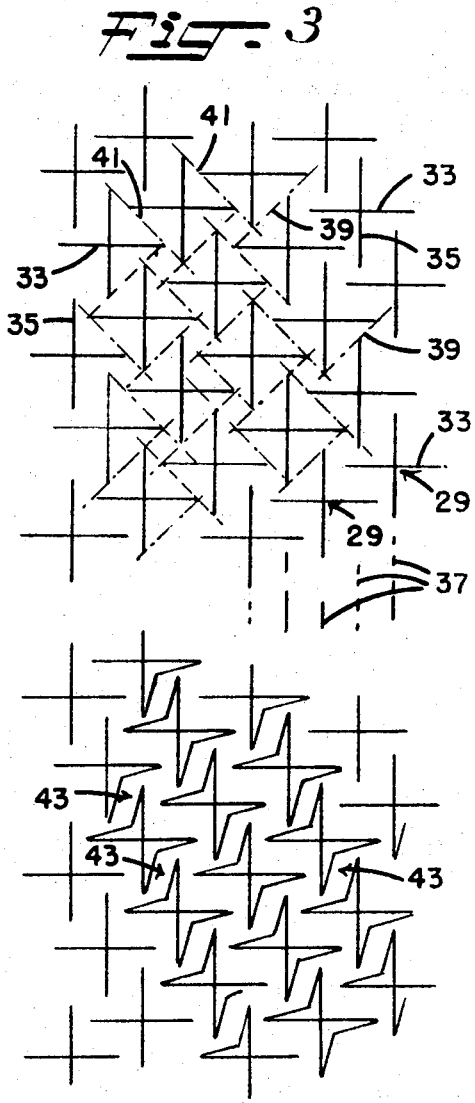
Fig. 3
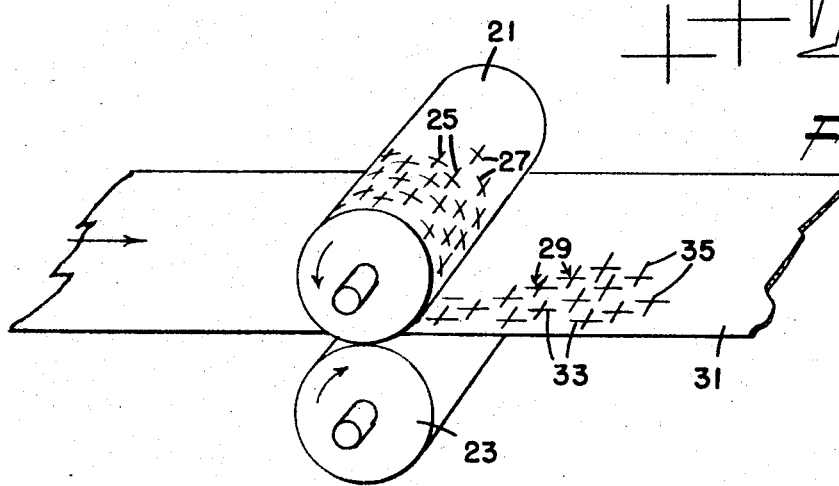
Fig. 1
Fig. 4

METHOD OF MAKING FORAMINOUS STRUCTURES

The invention relates to a method of making foraminous structures.

In my U.S. patent application Ser. No. 714,231, now U.S. Pat. No. 3,616,025 there is disclosed a method for making foraminous or cellular structures in which a pliable web material is slit along only a portion of the length of each of a series of lines defining a plurality of abutting parallelograms, with the slits of the individual parallelograms meeting or intersecting at only one pair of diagonally opposed corners thereof. The slits of such individual parallelograms terminate short of their other pair of diagonally opposed corners and thus the ends of such slits are separated by narrow neck sections of web material. Each of the portions of the web material extending between these neck sections is then pivoted as a planar unit by twisting the web material in the area of the neck sections into a helical configuration. The free corners of the individual parallelograms; that is, the diagonally opposed corners thereof at which the slits meet, are thus moved in opposite directions away from the plane of the original web material.

In view of the twisting of the web material in the areas of the neck sections, the above-described method is not particularly suited for use with non-ductile, rigid or easily torn web materials, as for example, cellulosic films or paper. Accordingly, a primary object of this invention is to provide a generally new or improved and more satisfactory method for making the same foraminous structure.

Another object is the provision of a method of making an improved foraminous structure which is light in weight, possesses good structural volume, rigidity and strength and can be made with low manufacturing costs and from inexpensive materials, including web materials which are non-ductile, rigid, or easily torn.

Still another object is the provision of a method of making an improved integral foraminous structure formed of a single web material in which stress concentrations are at least minimized to avoid tearing areas thereof.

A still further object is the provision of a method of making an improved composite product having a honeycomb structure as a core.

These and other objects are accomplished in accordance with the present invention by a method in which a web material is provided with rows of like, equally spaced cross-cuts, each of which is comprised of a pair of slits of equal length crossing substantially centrally of and at right angles to each other. Each cross-cut is arranged with ends thereof located along a common line passing through the ends of slits of an adjacent cross-cut. More particularly, cross-cuts, as defined above, are located at the corners of an array of abutting squares. One slit of each such cross-cut extends at an angle of 45°+θ to a line joining its center with the center of an adjacent cross, with θ being an angle which is greater than zero but less than 45°. Portions of the web material which extend between adjacent cross-cuts are than pivoted as integral units by urging the same about axes which are generally coincident with the common lines passing through the ends of slits of the adjacent cross-cuts between which the respective web portions extend.

Each of the portions or units of the web material which extend between such adjacent cross-cuts can perhaps be best described as consisting of a pair of like surfaces, each having the configuration of an isosceles triangle. Slits of the adjacent cross-cuts extend only along the sides of the respective triangular surfaces which are of equal length, while the remaining sides of these triangular surfaces are disposed in abutting relationship along the common line passing through ends of slits of such adjacent cross-cuts. These remaining or unslit sides of the triangular surfaces are not in abutting relationship along their entire lengths, however, and thus the triangular surfaces are offset from each other along the common line passing through the ends of slits of the adjacent cross-cuts. In view of the offset relationship of the triangular surfaces, the diagonally opposed free corners of such pair of triangular surfaces are also offset from each other; that is, located equal distances from opposite sides of a plane bisecting, at right angles, the common line which passes through the ends of slits of adjacent cross-cuts.

Ideally, portions of the web material which are to be pivoted are turned about individual axes which are coincident with the common lines passing through the ends of slits of adjacent cross-cuts. In this manner the portions are pivoted as planar members; that is, without flexing and without creating stress concentrations, at which tearing may initiate, in the areas at which such portions remain attached to the original web material.

Included within the scope of the present invention are foraminous structures in which portions of the web material are pivoted as integral units but with sections thereof turning about lines which are slightly askew to the ideal pivot axes described above. This effect is experienced particularly when the turning forces are concentrated at one or both of the diagonally opposed free corners of the pair of triangular surfaces comprising such portion.

With a stiff or rigid web material, the pair of triangular surfaces comprising each such portion generally act together as a rigid body so that it is immaterial whether a turning force is applied to either or both of the free corners thereof. Thus, a turning force applied to one of these free corners tends to cause both of the triangular surfaces to pivot as a unit about the ideal pivot axis, along which are located the abutting sides of such triangular surfaces. Under such turning force, it appears that there is also a tendency for each of these triangular surfaces to pivot, respectively, along an axis which is in line with a slit extending along one side of the opposing triangular surface. As a result, pivoting does occur about the ideal pivot axis along that area in which unslit sides of the triangular surface are in abutting relationship. However, in each of the areas of the triangular surfaces which are adjacent to the remainder of such unslit sides pivoting occurs along axes which are between the ideal pivot axis and an axis in line with the slit side of an opposing triangular surface.

In one embodiment of the invention the pivoted portions or units of the web material are disposed in rows which are in generally parallel relationship with each other. In such structure the units may be pivoted to the same or different angles relative to the plane of the original web material, which angles may approach 180° from their original positions. If necessary, the units are fixed in their pivoted positions and, when moved through the maximum degree noted above and fixed in place, a structure is provided having openings which are reinforced at least along sections thereof.

In an alternative and preferred embodiment of the invention, the units or portions of the web material which are pivoted are disposed in rows with each such row of units intersecting at generally right angles with another row of pivoted units. Such units may also be pivoted to the same or different angle relative to the original plane of the web material, which angle may approach 180°. When such units are pivoted through an angle of substantially 90°, a honeycomb structure is provided. A continuous sheet may be disposed along one or opposite sides of such structure and attached to the outermost ends of the pivoted units to provide a rigid panel having good strength properties. On the other hand, pivoting the units through an angle approaching 180° and fixing the same in place provides a foraminous structure having generally rectangular openings which are reinforced along sections thereof.

Once portions of the web material have been pivoted as described above, the areas of the original web material which remain are in the form of spaced surfaces, all of which, of course, are in a common plane. Each of the pivoted units is actually a wall which extends between and is attached to a pair of such spaced surfaces and, of course, is disposed at an angle thereto. As heretofore mentioned, the units or walls are arranged in parallel rows. If pivoted to the same degree the units or walls of one row will all be disposed in generally parallel relationship. Such walls, however, will be in staggered relationship with the units or walls in adjacent parallel rows and will be aligned with walls which are remote from such adjacent rows.

In all embodiments of the invention, the portions or units or walls of the web material which are pivoted or turned each include a pair of corners which are formed by free edges extending along converging planes from the areas at which such portions are pivoted or hinged to the remainder of the web material. In the ideal and preferred arrangement heretofore mentioned, the portions of the web material are pivoted as planar members so that tearing or twisting of the web material at the locations of hinging is avoided. The spaced surfaces to which such pivoted planar portions or walls are attached are of generally square configuration, with the planar walls being hinged to such square surfaces along the edges thereof. In the other of the embodiments, these spaced surfaces are of generally zig-zag form, with the pivoted portions or walls being hinged to straight edges thereof.

As described above, each cross-cut is arranged with the ends of slits thereof located along a common line which passes through the ends of slits of an adjacent cross-cut. Thus, the lengths of the slits of the cross-cuts and the spacing of such cross-cuts are interdependent and both are varied when it is desired to change the size of the portions of the web material which are to be pivoted.

The terminology "cross-cut", as employed throughout the description and claims, is intended to include like slits crossing each other centrally and at right angles to each other, regardless as to the manner by which such slits are formed. Thus, while such crossing slits are perhaps most easily formed by actual cutting of the web material, they may be also formed, for example, as by melting, burning or dissolving portions of the web material.

The method of the present invention is particularly useful with materials which have low ductility, or are rigid or are easily torn, as for example, cellulosic films and paper. The described method is equally well suited for use with pliable or ductile materials such as the materials which are thermoplastic, for example polyamides or superpolyamides, polyesters, polyvinyl chlorides, and copolymers thereof, polyolefins, and cellulose acetates; thermosetting materials, sheet metals, such as aluminum, copper, brass, sheet steel; fabrics; impregnated fibrous webs; and etc.

With the exception of the web materials formed of ductile materials, it is generally necessary to set the pivoted portions of the web material to fix the same in position. Thus, with web materials which are of thermoplastic character, the portions of the web material which extend between adjacent cross-cuts or the areas of such portions which are to be flexed may, for example, be in a heat softened condition while they are being pivoted and then cooled to set the same in fixed positions. Thermosetting web material may, of course, be set by heat, while materials, such as paper, fabrics, or fibrous webs, may be fixed by the application of coatings or activation of coatings or impregnating materials already present to stabilize the same. When pivoted portions of the web material have been moved through an angle approaching 180° from their original planes they may be fixed or sealed in such positions by adhesive or, in the case of thermoplastic materials, by fusion.

As heretofore mentioned, a continuous sheet, web material or other flat member may be attached to one and desirably both sides of the preferred foraminous structure of the present invention to provide a panel or composite product having great strength and rigidity. Attachment of such continuous sheet may be effected, for example, by adhesives, fusion or perhaps by projecting the free corners of the pivoted walls through suitable slots in the sheets themselves, after which such corners may be distorted as by bending, twisting, or may be fused to the sheets to lock the same in place.

In the panels or composite products described, it will be apparent that sheets fixed to the cellular or honeycomb core structure maintain the pivoted walls thereof in fixed positions. Moreover, such attached sheets serve also to distribute loads over a large area of the composite product and, if desired, may be made fluid tight to impart buoyant and perhaps heat insulation characteristics to such product.

The continuous sheets or flat members may be formed of any desired materials and may be the same or different from that of the honeycomb structure itself. Such sheets may include the various additives, such as colorants, stabilizers, etc. and, in the case of plastic material may be of transparent or translucent character.

Apparatus for use in the method of the present invention includes means for providing a pliable web material with spaced rows of cross-cuts, arranged as described above, and means, such as suitable projections, for engaging at least one and preferably both diagonally opposed free corners of the units or portions of the web material located between adjacent cross-cuts for pivoting the same as integral units by urging the opposed free corners thereof in opposite directions relative to the plane of the original web material. Preferably, the apparatus is designed for continuous manufacture of the foraminous structures of the present invention. Thus, the means for cutting the web material as well as the projections may be carried by suitable pulleys or belt conveyors so as to permit the same to perform their intended operations on a web material concomitantly with its continuous travel.

As with the apparatus disclosed in my above noted patent, the apparatus may also include means for providing a continuous sheet with slits at spaced locations corresponding to the spacing with the pivoted portions of the web material, means for disposing the slit sheet onto the pivoted portions of the web material so that such portions project partially through the flat sheet, and means for distorting the projecting partitions of the pivoted portions of the web material to thus lock the sheet in place.

In the drawing, FIG. 1 is a diagrammatic illustration showing a web material being provided with rows of cross-cuts for use in the method of the present invention;

FIG. 2 illustrates, on an enlarged scale, the geometric construction of the cross-cuts provided in the web material;

FIG. 3 is a fragmentary plan view of a section of the slit web material shown in FIG. 1 on which are illustrated axes along which portions of the web material extending between adjacent cross-cuts may be pivoted as planar units;

FIG. 4 is a view similar to FIG. 3 illustrating portions of the web material pivoted about certain parallel axes through an angle of less than 90° from their original positions;

Figure 5:
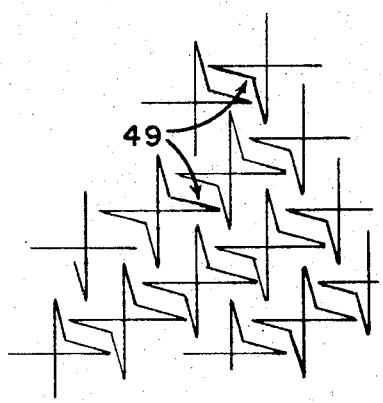
FIG. 5 is a view similar to FIG. 4 illustrating portions of the web material shown in FIG. 3 after being pivoted about certain other parallel axes through an angle of less than 90° from their original positions.

With reference to the drawing, FIG. 1 illustrates a slitter roll 21 and an anvil roll 23, both of which are driven by suitable means, not shown, in the directions as indicated by arrows. Projecting from the peripheral surface of slitter roll 21 are a series of crossing blades 25 and 27 which cooperate with the peripheral surface of the roll 23 to provide rows of like, equally spaced cross-cuts 29 in a continuous web material 31, as for example a metal ductile sheet, as it is advanced therebetween. The cross-cuts 29 are each comprised of a pair of slits 33 and 35 which intersect substantially centrally of and at right angles to each other and are each arranged with ends thereof located along a common line passing through the ends of slits of an adjacent cross-cut.

In the above-described relationship of cross-cuts 29, the centers of the respective cross-cuts are actually located at corners of a plurality of like abutting squares, with adjacent squares having common corners. One such square is illustrated in FIG. 2 and includes corners lettered as A, B, C and D at which are located the centers of four adjacent cross-cuts 29.

Referring to the cross-cut 29 located at the corner A, the lines A-E and A-F designate one-half of the lengths of the cross-cut slits 33 and 35, respectively. The line A—E extends at an included angle of 45°+$\theta$ relative to the side A—B of the illustrated square and, at point E, meet with a line G-H which bisects the side A-B and extends at an angle of 90°+$\theta$ relative thereto. In both of the above-mentioned angles, $\theta$ is the same and equal to an angle which is greater than zero degrees but less than 45°. The line A-F, of course, extends at right angles to the line A-E with its point F also being located on the line G-H. The lines A-J and A-K designate the remaining halves of the respective cross-cut slits 33 and 35 and are equal in length to the lines A-E and A-F, respectively.

The cross-cuts 29 at the remaining corners B, C and D are of the same construction as that described above and in each instance each cross-cut 29 will have one of its slits 33 and 35 form an included angle of 45°+$\theta$ with the side or line joining its center with the center of an adjacent cross-cut.

As heretofore described, the cross-cuts 29 are arranged in rows and, as is apparent from FIG. 3, the cross-cuts are aligned in various directions. The teachings of the present invention are applicable regardless of the direction of cross-cut alignment. However, for the sake of simplicity and clarity, reference is hereafter made primarily to the rows of cross-cuts 29 as being aligned along vertical lines 37.

The common lines passing through the ends of slits 33 and 35 of adjacent cross-cuts 29 have been designated in FIG. 3 by the characters 39 and 41. More particularly, considering the cross-cuts 29 as being disposed in vertical rows, the lines 39 pass through the ends of the slits 33 and 35 of adjacent cross-cuts 29 which are located along adjacent rows or lines 37, while the lines 41 pass through the ends of the slits 33 and 35 of adjacent cross-cuts 29 which are located along alternate rows or lines 37.

Ideally, the portions of the web material extending between adjacent cross-cuts 29, which portions are indicated at 43, are pivoted or hinged as planar members about axes which are coincident with the lines 39 and 41. With care the portions 43 can be pivoted about these ideal axes and in this manner foraminous structures having the most desirable properties are provided. However, included within the scope of the present invention are foraminous structures in which sections of the portions 43 are pivoted about axes which are slightly askew to the lines 39 and 41, which axes are assumed particularly when the portions 43 are pivoted under forces applied in the vicinity of one or both of their diagonally opposed free corners.

More particularly, each of the portions 43 consists of a pair of like surfaces, each having the configuration of an isosceles triangle, as designated at AFJ and DLM in FIG. 2. All of the sides AF, AJ, DL, and DM are of equal lengths with the slits 33 extending along the sides AJ and DL, while the slits 35 extend along the sides AF and DM. The remaining sides FJ and LM of these triangular surfaces are coincident with the common line passing through ends of slits 33 and 35 of adjacent cross-cuts 29, which is the ideal pivot axis, and abut each other only along the lengths thereof designated as JL. The two triangular surfaces are thus offset from each other along this common line or ideal pivot axis with their free corners being located equal distances from the opposite sides of a plane which bisects the desired pivot axis FM at right angles.

With a stiff or rigid web material 31, the pair of triangular surfaces AFJ and DLM together react much like a rigid body when a turning force is applied to either or both of the free corners of such surfaces. Upon the application of such force or forces there is a tendency for the portion 43 to pivot about the ideal pivot axis extending between F and M. It appears that there is also a tendency for the triangular surfaces AFJ to pivot about an axis which is in line with the side DL and a similar tendency for the triangular surface DLM to pivot about an axis which is in line with the side AJ. As a result, the turning moment which encourages pivoting of the portion 43 along the ideal pivot axis does, in fact, effect such turning along the length thereof extending between L and J. Under this same moment there is a tendency for pivoting to occur also along the lines FL and JM. It appears, however, that this latter tendency is partially offset by the moments encouraging the triangular surfaces AFJ and DLM to pivot about axes which are in line, respectively, with the sides DL and AJ. The net result of these moments is that pivoting also occurs along axes as indicated at 45 and 47 in FIG. 2, with axes 45 extending between the ideal pivot axis and an axis in line with the side DL while the axis 47 is disposed between the ideal pivot axis and an axis in line with the line AJ.

While pivoting of the respective portions 43 as described above will occur under certain applications of forces, and the foraminous structures provided by this procedure are considered to be within the scope of the present invention, for simplicity and ease of description, the remainder of the detailed description is primarily confined to a method in which the portions 43 are pivoted about the ideal axes as indicated by the lines 39 and 41, and the structures formed thereby.

In FIG. 4, the portions of the web material 43, extending between adjacent cross-cuts 29 in adjacent rows of cross-cuts are illustrated as being pivoted as planar units through an angle of less than 90° relative to the plane of the original web material 31. The portions of the web material extending between adjacent cross-cuts 29 in alternate rows of cross-cuts are indicated by character 49 in FIG. 5 where they are illustrated as being pivoted similarly to the planar units 43 of FIG. 4.

Figure 6:
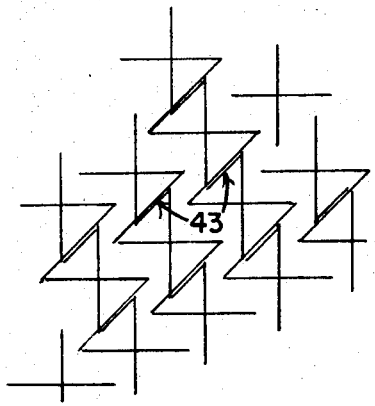
FIG. 6 is a view similar to FIG. 4 illustrating the planar portions thereof after being pivoted through angles of substantially 90° from their original positions.
Figure 7:
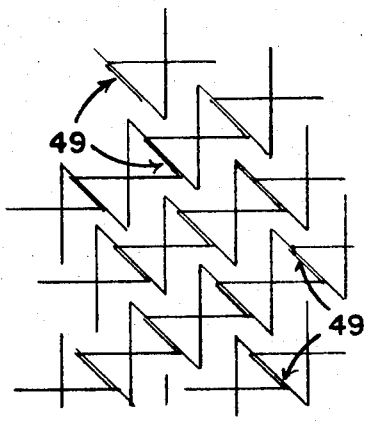
FIG. 7 is a view similar to FIG. 5 illustrating the planar portions thereof after being pivoted through an angle of substantially 90° from their original positions.
Figure 8:
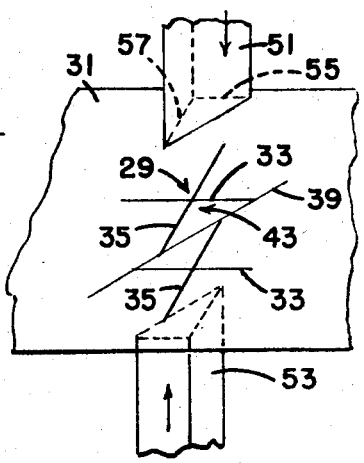
FIG. 8 is a diagrammatic illustration of apparatus for pivoting planar portions of the web material into positions as shown in FIGS. 6 and 7.

The respective FIGS. 6 and 7 show the portions of the web material or planar units 43 and 49 after being pivoted through an angle of 90° out of the plane of the original web material 31. Pivoting of the planar units 43 and 49 into positions shown in FIGS. 4–7, may be achieved by any suitable means. For example, as shown in FIG. 8 a pair of triangular projections 51 and 53 may engage with the free end portions of an individual planar unit 43 or 49 from opposite sides of the web material 31 and thus pivot the same about its respective pivot or hinge axis 39 or 41. The projections 51 and 53 are of like cross-section, each having the configuration of an isosceles triangle in which like sides 55 and 57 are of a length slightly less than one-half of the cross-cut slits 33 and 35. As disclosed in my above-noted pending application, projections 51 and 53 may be provided along opposing surfaces of a pair of movable endless belts so as to permit such projections to pivot the planar units 43 and/or 49 concomitantly with the advancement of the web material between and together with such belts.

Figure 9:
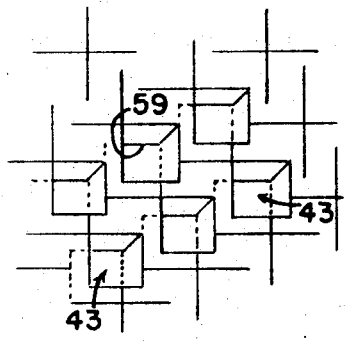
FIG. 9 is a view similar to FIG. 6 illustrating the planar portions thereof after being pivoted substantially 180° from their original positions.
Figure 10:
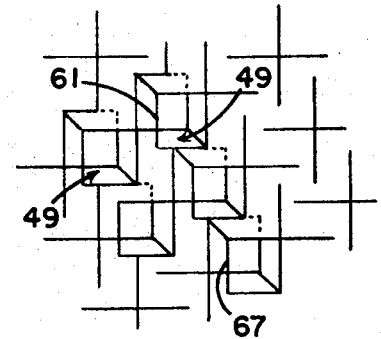
FIG. 10 is a view similar to FIG. 7 illustrating the planar portions thereof after being pivoted substantially 180° from their original positions.

FIGS. 9 and 10 illustrate the planar units 43 and 49 of the web material 31 pivoted still further from their positions shown in FIGS. 6 and 7, and approaching an angle of 180° from the plane of the original web material. The planar units 43 and 49 may be fixed, as by sealing, in their positions shown in FIGS. 9 and 10 to provide a foraminous structure having openings as indicated at 59 in FIG. 9 and at 61 in FIG. 10.

Figure 11:
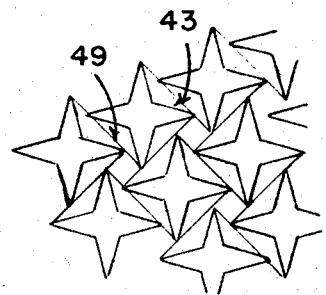
FIG. 11 is a view similar to FIGS. 4 and 5 illustrating the planar portions of the web material after being pivoted less than 90° from their original positions about axes extending at right angles to each other.
Figure 12:
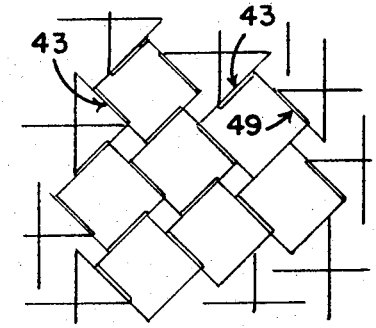
FIG. 12 is a view similar to FIG. 11 illustrating the planar portions thereof after being pivoted substantially 90° from their original positions.
Figure 13:
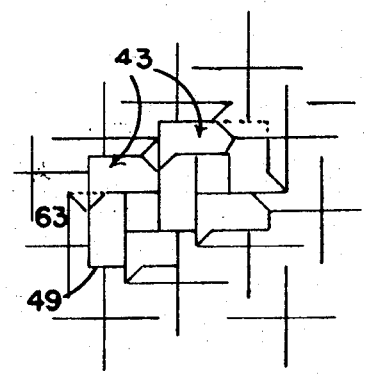
FIG. 13 is a view similar to FIGS. 11 and 12 illustrating the planar portions thereof after being pivoted through substantially 180° from their original positions.

The foraminous structure shown in FIG. 11 incorporates the teachings of the structures shown in FIGS. 4 and 5 with both the planar units 43 and 49 being pivoted less than 90° from their original positions about the respective lines 39 and 41. Likewise, FIG. 12 illustrates a structure in which the planar units 43 and 49 are both pivoted substantially 90° from the plane of the original web material 31, while in FIG. 13, the planar units 43 and 49 are shown in positions assumed after being moved substantially 180° from their original positions. In this latter structure, the planar units 43 and 49 define openings 63, and may be sealed in their pivoted positions, as by heat in the case of a thermoplastic web material, to reinforce the openings at least at the corners thereof.

Figure 14:
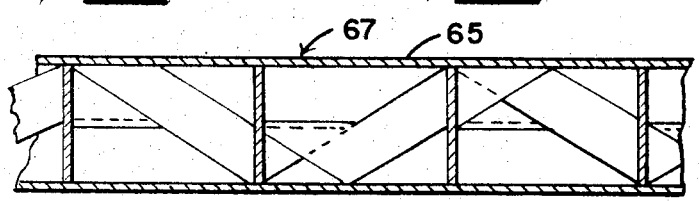
FIG. 14 is a vertical section through a panel having, as a core, the foraminous structure shown in FIG. 12.

The foraminous structure shown in FIG. 12 is of honeycomb configuration. A continuous sheet 65 may be attached to one or both sides of this particular structure to provide a panel 67, as shown in FIG. 14, which exhibits good strength yet is light in weight and rigid. The sheets 65 may be attached to the foraminous structure, for example, by fusing the same in place, in the case of thermoplastic materials, adhesives, etc. Alternatively, portions of the free ends of the pivoted planar units 43 and 49 may be extended through suitable slots in the sheets 65 and then twisted to lock such sheets in place.

The various embodiments of the foraminous structures described are adapted for various uses. The structures shown in FIGS. 4–7 and 9–13 are both decorative and functional and may be employed in such applications as packaging materials, article separators, ventilation screens, room dividers, temporary road and landing mats, fencing, mats for preventing beach erosion, etc. The panel illustrated in FIG. 14 is useful as a structural member, as for example, flooring, walls, roofs, partitions, article spacers, pallets, etc.

It is to be understood that changes and variations may be made without departing from the spirit and scope of the invention as defined in the appended claims.

I claim:

1. A method of making a foraminous structure including the steps of providing a web material with rows of like, equally spaced cross-cuts, each of the cross-cuts comprised of a pair of slits of equal length crossing substantially centrally of and at right angles to each other and arranged with ends thereof located along a common line passing through the ends of slits of an adjacent cross-cut, and pivoting as integral units portions of the web material which extend between adjacent cross-cuts by urging the same about axes which are generally coincident with the common lines passing through the ends of slits of the adjacent cross-cuts between which the respective portions of the web material extend.

2. A method as defined in claim 1 wherein the pivoted units of web material are disposed in rows which are in substantially parallel relationship with each other.

3. A method as defined in claim 2 wherein the units are pivoted substantially 180° relative to the original plane of the web material and are fixed in their pivoted positions.

4. A method as defined in claim 1 wherein the pivoted units of web material are disposed in rows with each row of such units intersecting at substantially right angles with another row of pivoted planar units.

5. A method as defined in claim 4 wherein all units of web material are pivoted through an angle of substantially 90° relative to the original plane of the web material.

6. A method as defined in claim 5 further including the step of attaching a continuous sheet to the outermost ends of the pivoted units of the web material to provide a cellular panel structure.

7. A method as defined in claim 4 wherein the units are pivoted substantially 180° relative to the original plane of the web material and are fixed in their pivoted positions to provide the web material with openings of generally rectangular configuration.

* * * * *